US008456306B2

(12) United States Patent
Lin et al.

(10) Patent No.: US 8,456,306 B2
(45) Date of Patent: *Jun. 4, 2013

(54) ASSOCIATION BASED LOCATIONING FOR RFID

(75) Inventors: Lang Lin, Potomac, MD (US); Victor Hugo Molina, Germantown, MD (US)

(73) Assignee: Symbol Technologies, Inc., Holtsville, NY (US)

( * ) Notice: Subject to any disclaimer, the term of this patent is extended or adjusted under 35 U.S.C. 154(b) by 849 days.

This patent is subject to a terminal disclaimer.

(21) Appl. No.: 12/336,730

(22) Filed: Dec. 17, 2008

(65) Prior Publication Data

US 2010/0148985 A1    Jun. 17, 2010

(51) Int. Cl.
*G08B 13/14* (2006.01)

(52) U.S. Cl.
USPC ............. 340/572.1; 340/10.1; 340/10.32; 340/10.41; 340/10.5; 340/572.7

(58) Field of Classification Search
USPC ............ 340/572.1, 572.2, 572.7, 825.49, 340/10.32, 10.1, 10.41, 10.5; 342/44, 127
See application file for complete search history.

(56) References Cited

U.S. PATENT DOCUMENTS

| | | | |
|---|---|---|---|
| 5,640,151 A | 6/1997 | Reis et al. | |
| 5,774,876 A | 6/1998 | Woolley et al. | |
| 6,040,774 A | 3/2000 | Schepps | |
| 6,600,418 B2 | 7/2003 | Francis et al. | |
| 7,081,818 B2 | 7/2006 | Eckstein et al. | |
| 7,170,412 B2 | 1/2007 | Knox et al. | |
| 2005/0110641 A1* | 5/2005 | Mendolia et al. | 340/572.7 |
| 2006/0176152 A1 | 8/2006 | Wagner et al. | |
| 2007/0018793 A1 | 1/2007 | Stewart et al. | |
| 2007/0188318 A1 | 8/2007 | Cole et al. | |
| 2007/0285236 A1 | 12/2007 | Batra | |
| 2007/0296581 A1 | 12/2007 | Schnee et al. | |
| 2009/0212921 A1* | 8/2009 | Wild et al. | 340/10.5 |
| 2010/0045436 A1* | 2/2010 | Rinkes | 340/10.1 |
| 2010/0201520 A1* | 8/2010 | Stern et al. | 340/572.1 |
| 2011/0050400 A1* | 3/2011 | Ho et al. | 340/10.42 |

OTHER PUBLICATIONS

Final Office Action mailed Apr. 20, 2011 in U.S. Appl. No. 12/195,613, Charles Rinkes, filed Aug. 21, 2008.
Non Final Office Action mailed Nov. 17, 2010 in U.S. Appl. No. 12/195,613, Charles Rinkes, filed Aug. 21, 2008.

* cited by examiner

*Primary Examiner* — Brent Swarthout
(74) *Attorney, Agent, or Firm* — Bartholomew J. DiVita; Steven A. May; Kenneth A. Haas

(57) ABSTRACT

An apparatus, system and techniques for determining a location of an RFID tag among a population of tags are disclosed. The system includes an RFID reader with at least one antenna port and a population of RFID tags. The population of tags can be homogenous or heterogeneous. The RFID reader varies its transmit power through one or more antenna ports resulting in a grouping of the RFID tags into clusters. In one embodiment, the reader utilizes multiple antennas to further define RFID tag clusters among the population. Each read tag is then uniquely associated with a defined cluster. Tag agents also can be provided among the population of tags facilitating definition of the clusters.

23 Claims, 4 Drawing Sheets

ASSOCIATION BASED LOCATIONING FOR RFID

TECHNICAL FIELD

This disclosure relates to RFID technology and, more particularly to RFID tag locationing.

BACKGROUND

Radiofrequency identification (RFID) tags are well known in the art. RFID tags are small electronic circuits that respond with a data-carrying RF reply signal when interrogated with an REF signal at a particular frequency. Tags are either passive or active. Passive tags rely on the energy of the interrogation signal to generate the reply signal; active tags carry their own battery. Active tags have a much longer range than active tags. Active tags typically can be queried at farther distances than passive tags. In recent years, the maximum range of both passive and active tags has been increased by technological advancements in the field.

A problem with REID tags is determining where the tag is located relative to the RFID reader device. Traditionally, locationing has been possible only with expensive RFID active tags that cost significantly more than passive tags, limiting passive tag applicability to tracking more expensive assets.

It is also a very challenging task to physically locate a passive tag by a reader or a set of readers. These challenges can be multifold. For example, in a warehouse environment, tags and readers may not be in the line of sight communication, thus communication between tags and readers can be diminished. In addition, the backscatter communication signals from tags can be weak and the backscattered messages short, further impacting effective communication between tags and readers.

Accordingly, there is a need for improved techniques and systems to effectively provide passive tag location information from among a RFID tag population.

SUMMARY

An apparatus, system and techniques for determining a location of an RFID tag among a population of tags are disclosed. The system includes an RFID reader with at least one antenna port and a population of RFID tags. The population of tags can be homogenous or heterogeneous. The RFID reader varies its transmit power through one or more antenna ports resulting in a grouping of the RFID tags into clusters. In one embodiment, the reader utilizes multiple antennas to further define RFID tag clusters among the population. Each read tag is then uniquely associated with a defined cluster. Tag agents also can be provided among the population of tags facilitating definition of the clusters.

Various aspects of the invention relate to defining clusters based on transmit signal strength and associating tags with the clusters.

For example, according to one aspect, a method of mapping RFID tag locations to transmit power levels includes setting a first signal of an RFID reader to a first signal strength, providing the first signal to the population of tags, and associating a first tag responsive to the first signal with a first cluster of tags, the first cluster of tags being in an approximate first known physical location. The method also includes setting a second signal of the RFID reader to a second signal strength, the second signal strength different from the first signal strength, providing the second signal strength to the population of tags, and associating a second tag responsive to the second signal with the second cluster of tags, the second cluster of tags being in a different physical location than the first cluster of tags.

In one embodiment, the method includes establishing at least one of the first and second clusters using a tag agent, the tag agent being positioned among the population of tags at a pre-defined location.

In another aspect, a system for mapping RFID tag locations includes a plurality of RFID tags, and a RFID reader including at least one antenna. The RFID reader is configured to set a first signal of an RFID reader to a first signal strength, provide the first signal through the at least one antenna to the population of tags, and associate a first tag responsive to the first signal with a first cluster of tags, the first cluster of tags being in an approximate first known physical location.

The reader is also configured to set a second signal of the RFID reader to a second signal strength, the second signal strength different from the first signal strength, provide the second signal through the at least one antenna strength to the population of tags, and associate a second tag responsive to the second signal with the second cluster of tags, the second cluster of tags being in a different physical location than the first cluster of tags.

In one embodiment, the RFID reader includes a plurality of antennas and one of the plurality of antennas transmits the first signal and another of the plurality of antennas transmits the second signal.

The reader can also establish at least one of the first and second clusters using a tag agent, the tag agent positioned among the population of tags at a pre-defined location and responsive to at least one of the first and second signal.

Additional features and advantages will be readily apparent from the following detailed description, the accompanying drawings and claims.

BRIEF DESCRIPTION OF THE DRAWINGS

Like reference symbols in the various drawings indicate like elements.

DETAILED DESCRIPTION

Figure 1:
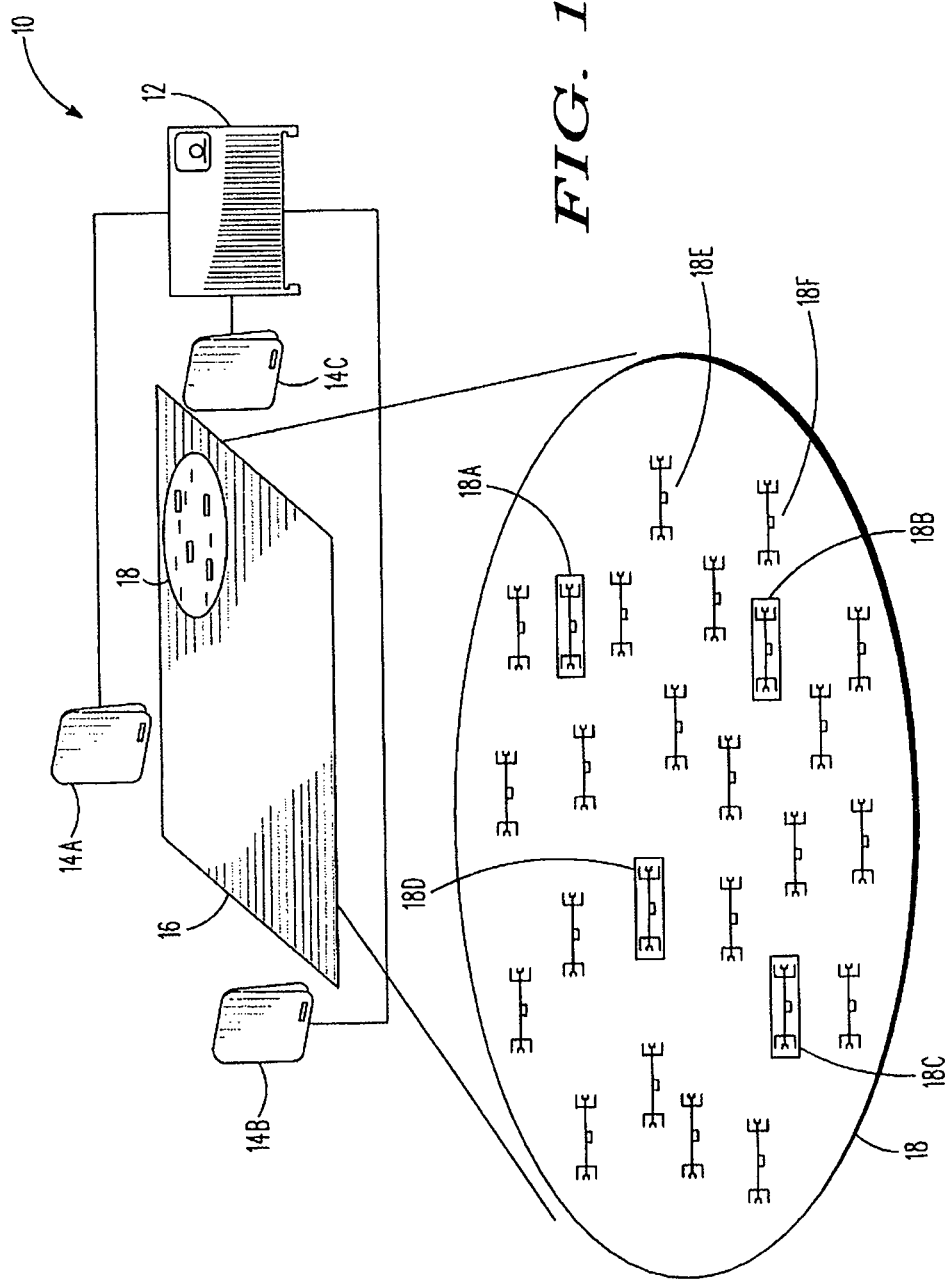
FIG. 1 illustrates example components of a system according to the present invention.

FIG. 1 illustrates a system 10 for providing RFID tag location information. As shown in FIG. 1, in one embodiment, the system 10 includes a RFID reader 12 that includes a plurality of antennas 14A-C. Although only one reader and three (3) antennas are shown in FIG. 1, the system 10 can be configured to include a plurality of readers each of which can include one or more antennas.

As shown in FIG. 1, the reader 12 is configured to communicate with a population of RFID tags 18 that located in and about a predefined environmental area 16. The environmental area 16 can be a warehouse environment, manufacturing environment, retail store environment, or any other environment where use of RFID technology is desirable.

The population of tags 18 can be homogeneous or heterogeneous tags. As shown in FIG. 1, in one embodiment, the population of tags includes a plurality of tag agents 18A. Tag agents 18A-D are identified RFID tags that are at a known physical location in the environment 16 and are preferably randomly distributed among the population 18. For example, a tag with identifier 'XYZ' at location 'ABC'. In one embodiment, tag agents 18A-D are specialized RFID tags. In another embodiment, tag agents 18A-D are identified from among the population of tags 18 based on an amount of time the particular tag is in a same location in the population 18. As discussed in further detail below, tag agents 18A-D can be used in tag clusters that allow particular non-agent tag locations to be inferred and can be either homogenous or heterogeneous based on whether non-agent tags are homogenous or heterogeneous.

In operation, the reader 12 transmits multiple interrogation signals using varying transmit power through its corresponding antennas 14A-C. One or more transponders or tags 18 respond by sending signals back to the reader 12. Preferably, the one or more tags include one or more tag agents 18A-D that are at a known location. The signal returned contains tag identification data that can be decoded by the interrogating reader 12 in order to retrieve relevant information about each tag 18, such as its unique identifier, price, etc. Signal can also contain information about the operational "state" of a tag, which assists reader 12 in determining an optimum tag interrogation interval to interrogate the population of tags 18.

Interaction between tag population 18 and reader 12 takes place according to certain communication protocols. Examples of such protocols include Class 0, Class 1, and more recently developed Generation 2, all of which are different classes approved by the RFID standards organization EPCglobal (EPC=Electronic Product Code).

Once tags 18 are identified, individual tags 18E-F may be addressed using their identifiers. For example, reader 12 may perform additional operations (e.g., read, write and lock) on a tag 18E within its operational field by first transmitting a "select" command, including the identifier of the tag, setting the identified tag 18E into a communicative state. The reader 12 may then utilize additional commands (e.g., write block, read block, lock block, etc) to control or access data of the selected tag 18E. For example, the reader 12 may read data from one or more memory blocks of the selected tag 18E using a read block command. In another example, the reader may write data to one or more memory blocks of the selected tag 18E using a write command. In another example, the reader may prevent further changes to one or more memory blocks of the selected tag using a lock command. Thus, operations performed upon tags 18E-F by reader 12 typically involves first selecting the tag using its identifier and then reading or writing data from and to the selected tag.

Figure 2:
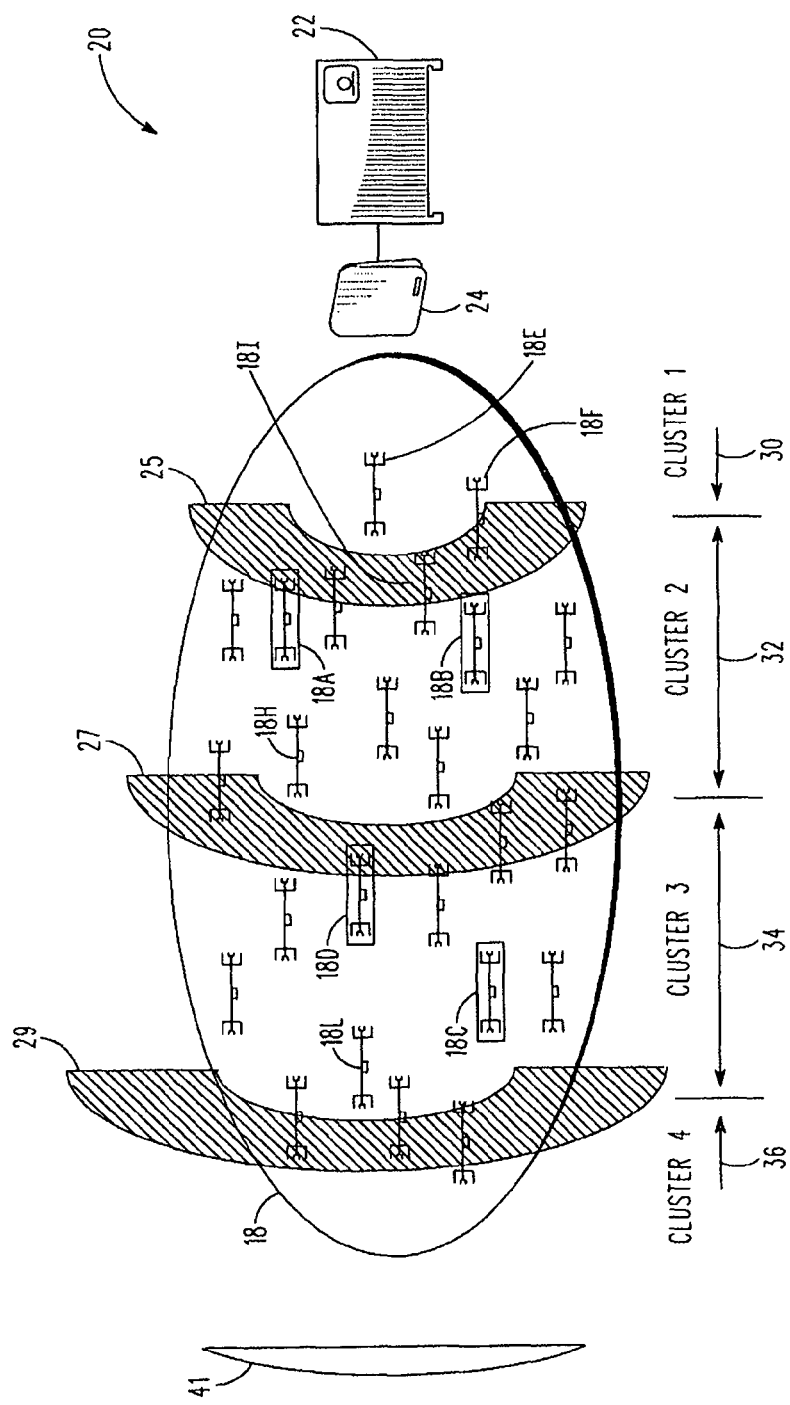
FIG. 2 illustrates clustering of an exemplary RFID tag population using a single RFID reader antenna according to the present invention.

Turning now to FIG. 2, a system 20 for clustering an exemplary RFID tag population using a single RFID reader 22 is disclosed. As shown in FIG. 2, reader 22 transmits a first signal having a first signal strength 25 to the tag population 18 using a single antenna 24. In one embodiment, the single antenna 24 is an omnidirectional antenna. Some of the tags 18-F, 18I receive the signal while other tags 18G-H are out of communicative range. Tags 18E-F, 18I receiving the first signal respond back with their tag identification data. Preferably, a tag agent is among the responding tags. Reader 22 then associates the tag identification data received from the tags 18E-F, 18I with a first grouping or cluster of tags 30. Next, the reader 22 sets a different signal strength 27 and transmits a second signal to the population of tags 18. Tags 18A-B, 18H-I receiving the second signal respond back with their tag identification data. Reader 22 then associates the tag identification data received from the tags 18A-B, 18H-I with a second cluster of tags 32. In one embodiment, if a tag 18I has responded back to both signals, reader 22 can determine that the tag 18T is physically located between the two clusters 30, 32.

Next, as shown in FIG. 2, the reader 22 transmits a third signal having a third signal strength 29 to the tag population 18 using the single antenna 24 and associates the tag identification data received from those tags with the third grouping or cluster of tags 34. Likewise, the reader 22 transmits a fourth signal having a fourth signal strength 41 to the tag population 18 using the single antenna 24 and associates the tag identification data received from those tags with the fourth grouping or cluster of tags 34.

In one embodiment, the signal strength set by the reader 22 during each signal transmission is in increasing strength (e.g., +0.5 dB). In another embodiment, the signal strength set by the reader 22 during each signal transmission is in decreasing strength (e.g., −0.5 dB).

It will be appreciated by one skilled in the art that by positioning tag agents 18A-D through out the population of tags 18, reader 22 is able to determine the approximate physical location of a tag in a general vicinity of a particular tag agent, as those tags can be communicated with at similar signal strengths. Accordingly, the reader 22 of the present invention formulates an association between tags and tag agents and can provide location information concerning non-agent tags. Furthermore, by varying the transmit power of the reader 22, the reader 22 can establish a plurality of tag clusters. If the clusters are disjoin sets, each communicable tag can uniquely associated with a cluster.

Figure 3:
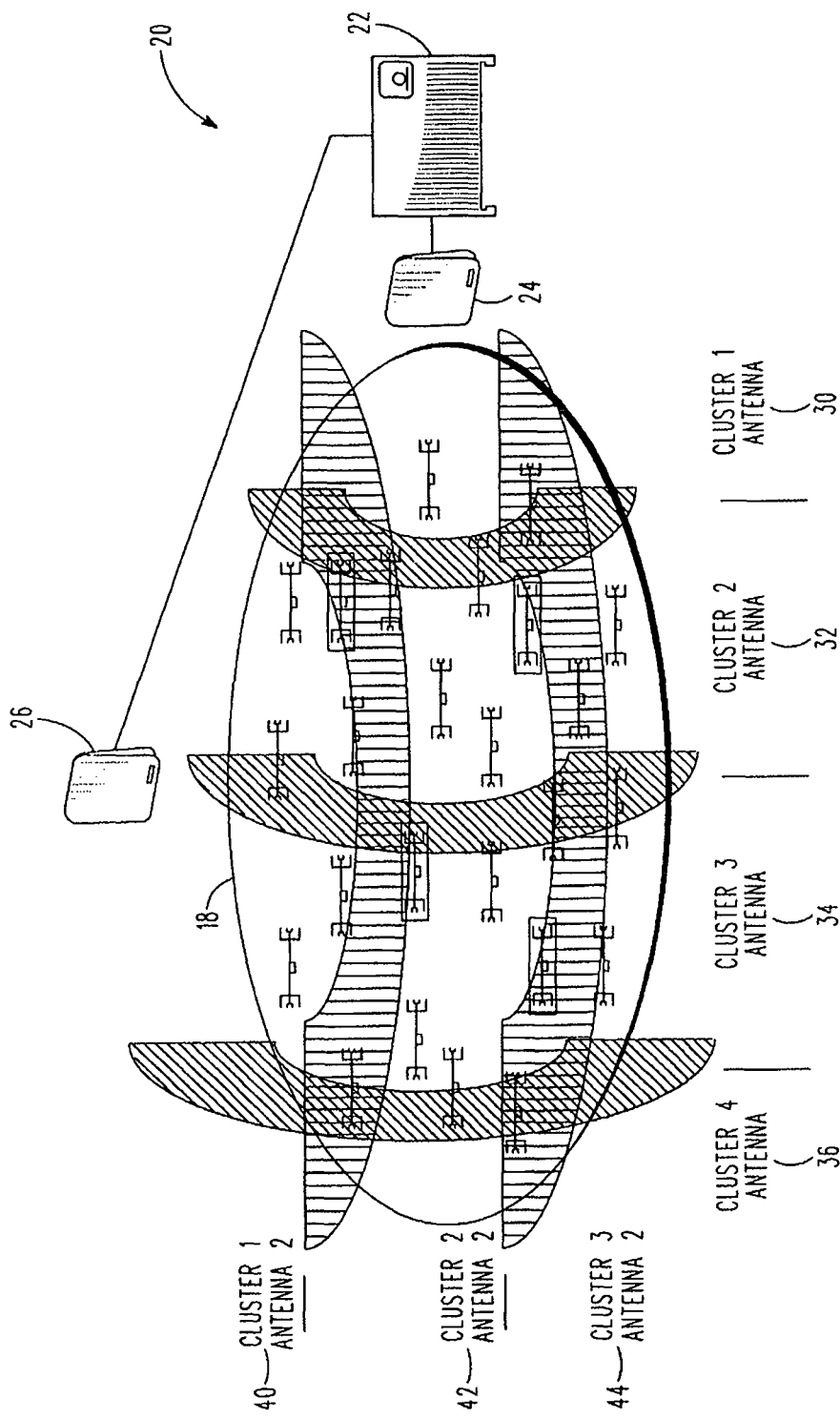
FIG. 3 illustrates clustering of an exemplary RFID tag population using multiple RFID reader antennas according to the present invention.

Referring now to FIG. 3, clustering of an exemplary RFID tag population using multiple RFID reader antennas according to the present invention is shown. As shown in FIG. 3, with two antennas 24, 26 transmitting signals at varying power levels, additional clusters of RFID tags can be obtained. For example, in the example shown in FIG. 3, the RFID reader 22 varies the transmit power to antenna 24 four times and varies the transmit power from antenna 26 three times resulting in seven different clusters being determined for the population of tags 18. This high level of cluster granularity allows the system 20 to provide more specific information concerning particular RFID tag locations. Advantageously, with N number of antennas 24, 26, if the clusters for each antenna 24, 26 are disjoin sets, each tag can uniquely associate with N clusters at most. As shown in FIG. 3, since there are only two antennas 24, 26, each tag in the population 18 can at the most associate with two clusters. In one embodiment, the two antennas 24, 26 are omnidirectional antennas.

In a simple environment such as free space, given the power level of each cluster, the present invention can be used to locate a tag based on its associated clusters or power levels. In more complex environments, where there are various communication obstructions and the electromagnetic field is irregular, one or more tag agents positioned among the tag clusters aids in locating a tag relative to the tag agent. As such, the location of RFID tags can be inferred using the present invention.

Figure 4:
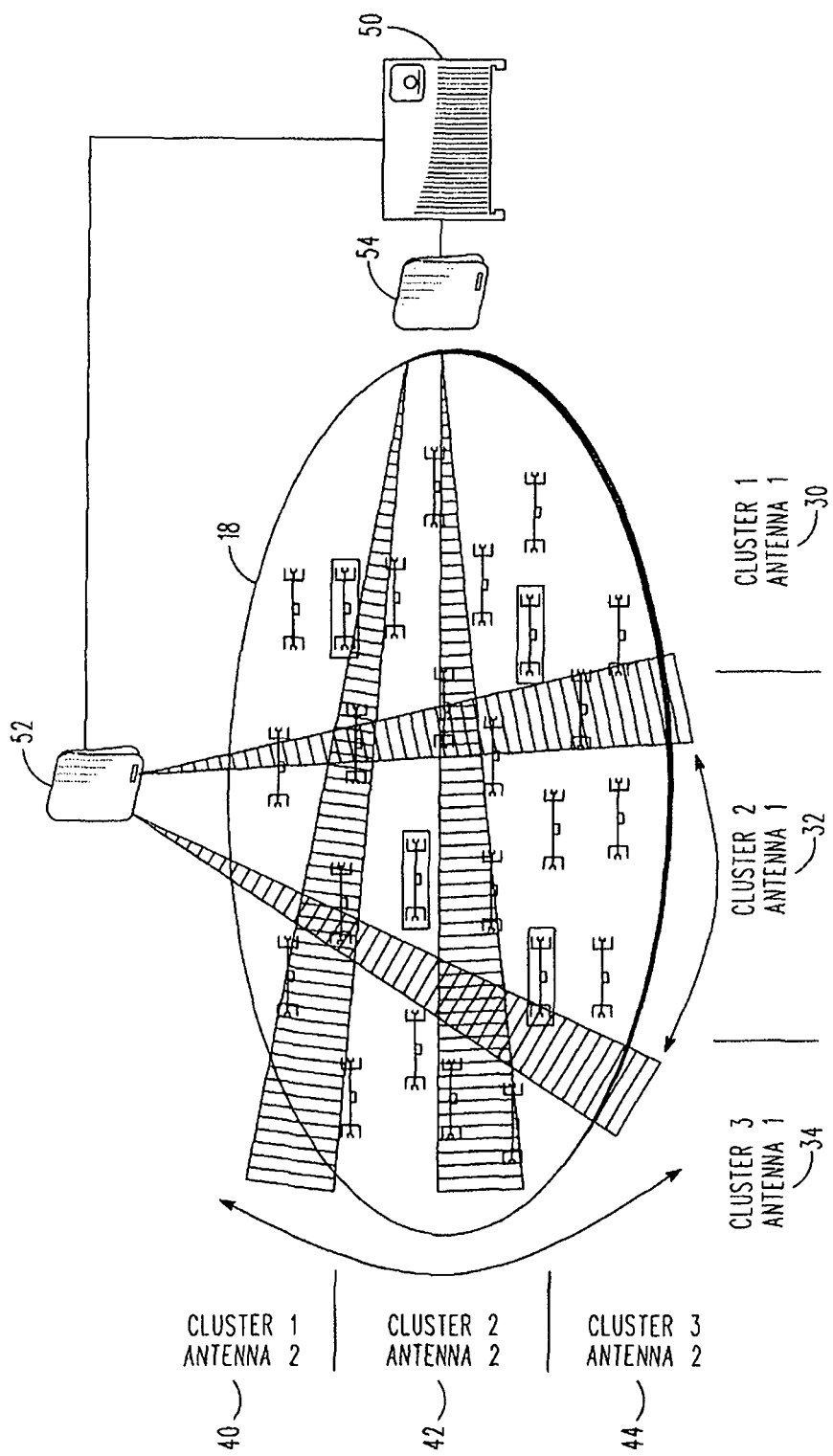
FIG. 4 illustrates clustering of an exemplary RFID tag population using a phased array antenna configuration according to the present invention.

Turning now to FIG. 4, clustering of an exemplary RFID tag population by an RFID reader 50 using a phased array antenna configuration 52, 54 is shown. Advantageously, using a phased array antenna, additional tunable parameters including signal strength can be varied to identify tag clusters. For example, as shown in FIG. 4, the reader 50 of the present invention is configured to control the radiation patterns 56, 58 of each of the antennas 52, 54. The varying radiation patterns can occur while the transmission signal strength of each antenna remains constant.

In the example shown in FIG. 4, the radiation pattern 56 provided by the first antenna 52 shifts between at least three positions identifying three tag clusters 30, 32, 34, respectively. Likewise, the radiation pattern 58 provided by the second antenna 54 shifts between at least three positions identifying three tag clusters 40, 42 44, respectively. Of course, it will be appreciated by one skilled in the art that the present invention is not limited to three varying radiation patterns per antenna and that any number of radiation patterns may be set for one or more phased array antenna configuration of the present invention.

Furthermore, the RFID readers of the present invention can combine the above-described clustering techniques. For example, in one embodiment, both varying radiation patterns and signal strengths are used by the RFID readers of the present invention to define RFID tag clusters. In addition to clustering tags based on transmission antenna related parameters, such as radiation pattern and signal strength, it is within the scope of the present invention to cluster tags based on any other distance related metrics, e.g., tag backscatter signal strength, phase, and time of arrival. For example, in one embodiment, RFID tags are clustered based on the backscatter phase angle obtained by varying the transmission signal frequency to the tags.

It will be appreciated that various presently unforeseen or unanticipated alternatives, modifications, variations, or improvements therein may be subsequently made by those skilled in the art which are also intended to be encompassed by the following claims. In addition, the claims can encompass embodiments in hardware, software, or a combination thereof.

What is claimed is:

1. A method of mapping RFID tag locations to transmit power levels comprising:
   setting a first signal of an RFID reader to a first signal strength or first radiation pattern;
   providing the first signal to a population of tags;
   associating a first tag responsive to the first signal with a first cluster of tags, the first cluster of tags being in an approximate first known physical location;
   setting a second signal of the RFID reader to a second signal strength or second radiation pattern, the second signal strength different from the first signal strength and the second radiation pattern different from the first radiation pattern;
   providing the second signal to the population of tags;
   associating a second tag responsive to the second signal with a second cluster of tags, the second cluster of tags being in a different physical location than the first cluster of tags.

2. The method of claim 1, comprising establishing at least one of the first and second clusters using a tag agent, the tag agent being positioned among the population of tags at a pre-defined location.

3. The method of claim 2, comprising associating the first tag with a first tag agent associated with the first cluster of tags.

4. The method of claim 3, wherein the first cluster of tags comprises a plurality of tag agents.

5. The method of claim 2, comprising associating the second tag with a second tag agent associated with the second cluster of tags.

6. The method of claim 5, wherein the second cluster of tags comprises a plurality of tag agents.

7. The method of claim 2, wherein one tag among the population of tags is identified as the tag agent based on an amount of time the one tag is in a same location among the population of tags.

8. The method of claim 1, comprising associating the first tag to the second cluster.

9. The method of claim 1, comprising:
   providing the first signal through a first antenna of the RFID reader; and
   providing the second signal through a second antenna of the RFID reader.

10. The method of claim 1, comprising establishing N clusters of tags using N antennas of the RFID reader, N being an integer value greater than 1.

11. The method of claim 1, using at least one of a tag backscatter signal strength, phase, and time of arrival to associate at least one of the first tag with the first cluster and the second tag with the second cluster.

12. A system for mapping RFID tag locations comprising:
   a plurality of RFID tags; and
   a RFID reader comprising at least one antenna, the RFID reader configured to:
      set a first signal of an RFID reader to a first signal strength or first radiation pattern;
      provide the first signal through the at least one antenna to a population of tags;
      associate a first tag responsive to the first signal with a first cluster of tags, the first cluster of tags being in an approximate first known physical location;
      set a second signal of the RFID reader to a second signal strength or second radiation pattern, the second signal strength different from the first signal strength and the second radiation pattern different from the first radiation pattern;
      provide the second signal through the at least one antenna to the population of tags;
      associate a second tag responsive to the second signal with a second cluster of tags, the second cluster of tags being in a different physical location than the first cluster of tags.

13. The system of claim 12, wherein the RFID reader comprises a plurality of antennas and one of the plurality of antennas transmits the first signal and another of the plurality of antennas transmits the second signal.

14. The system of claim 12, wherein the reader establishes at least one of the first and second clusters using a tag agent, the tag agent positioned among the population of tags at a pre-defined location and responsive to at least one of the first and second signal.

15. The system of claim 14, wherein the reader associates the first tag with a first tag agent associated with the first cluster of tags.

16. The system of claim 15, wherein the first cluster of tags comprises a plurality of tag agents.

17. The system of claim 14, wherein the reader associates the second tag with a second tag agent associated with the second cluster of tags.

18. The system of claim 17, wherein the second cluster of tags comprises a plurality of tag agents.

19. The system of claim 14, wherein the reader identifies one tag among the population of tags as the tag agent based on an amount of time the one tag is in a same location among the population of tags.

20. The system of claim 12, wherein the reader associates the first tag to the second cluster.

21. The system of claim 12, wherein the reader provides the first signal through a first antenna of the RFID reader and provides the second signal through a second antenna of the RFID reader.

22. The system of claim 12, wherein the reader establishes N clusters of tags using N antennas associated with the RFID reader, N being an integer value greater than 1.

23. The system of claim 12, wherein the reader uses at least one of a tag backscatter signal strength, phase, and time of arrival to associate at least one of the first tag with the first cluster and the second tag with the second cluster.

* * * * *